Patented Feb. 6, 1923.

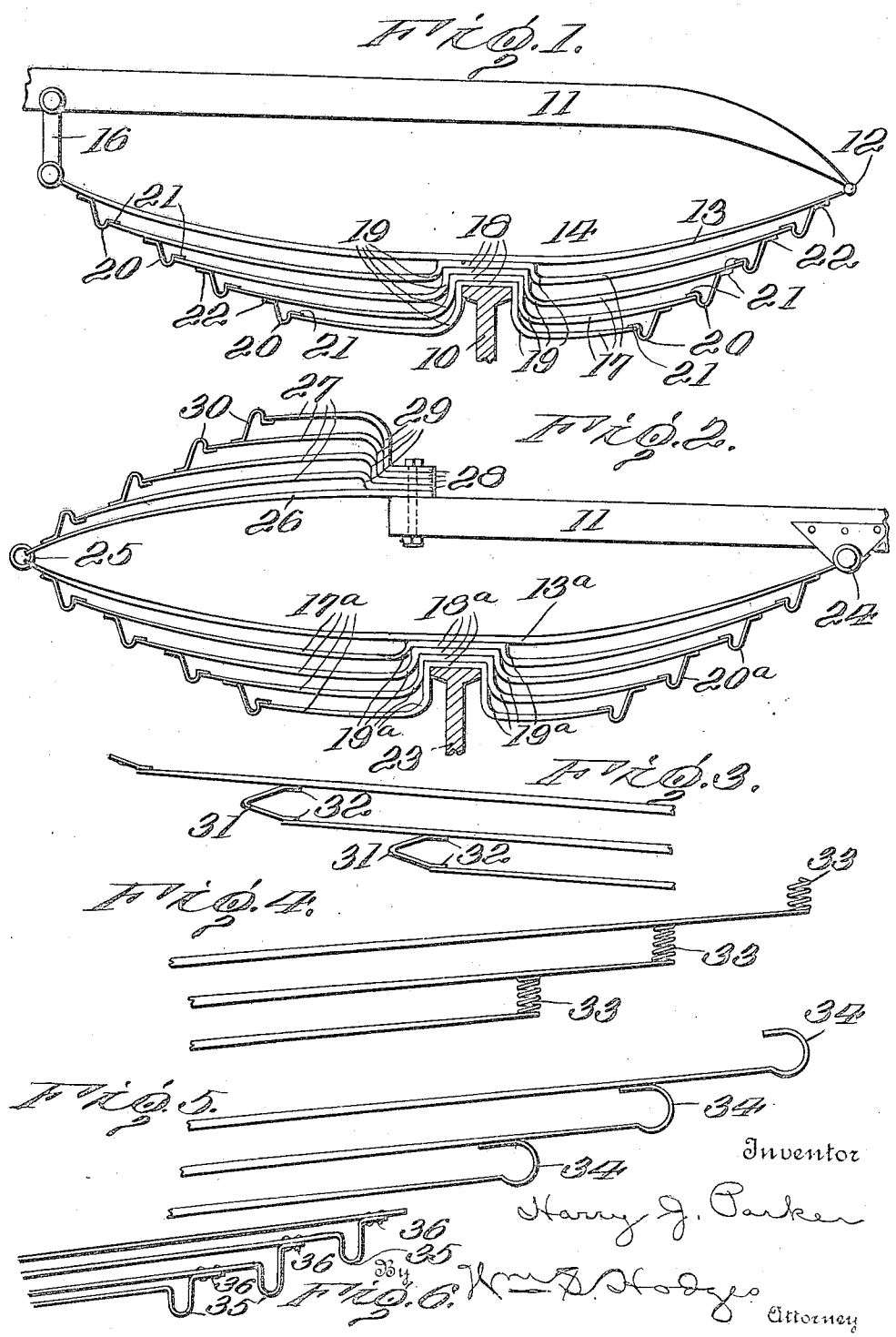

1,444,266

UNITED STATES PATENT OFFICE.

HARRY J. PARKER, OF SAN FRANCISCO, CALIFORNIA, ASSIGNOR, BY DIRECT AND MESNE ASSIGNMENTS, TO HARVEY WALBRIDGE, OF MONTALVO, CALIFORNIA.

VEHICLE SPRING.

Application filed March 23, 1920. Serial No. 368,119.

*To all whom it may concern:*

Be it known that I, HARRY J. PARKER, a citizen of the United States, residing at San Francisco, in the county of San Francisco and State of California, have invented a new and useful Vehicle Spring, of which the following is a specification.

This invention is a spring for use on motor vehicles and the like, although not limited thereto.

One of the objects of the invention is to provide a spring of the character mentioned which will possess maximum resiliency and be capable of substitution for the springs now in common use on motor vehicles without in any manner requiring alteration of the construction of the vehicle. A further object is to provide a spring formed of a plurality of leaves so related that friction on the leaves will be avoided. A further object is to provide a spring formed of a plurality of leaves so related that all stresses are simultaneously transmitted to all of the leaves at the same time whereby maximum strength and durability are obtained.

The invention will be hereinafter fully set forth and particularly pointed out in the claims.

In the accompanying drawing:—

Figure 1 is a side elevation illustrating a spring constructed according to the invention and applied to the front end of a vehicle. Figure 2 is a similar view illustrating a spring constructed in accordance with the invention and applied to the rear end of a vehicle. Figures 3, 4, 5 and 6 are detail views illustrating slight modifications.

Referring to Figure 1 of the drawing, 10 designates the front axle of a vehicle and 11 the front ends of the side bars of the chassis, conventionally illustrated, and which may be of any desired or preferred construction. Pivoted at the front end of the side bar 11, as indicated at 12, is the leaf 13 of a spring indicated as a whole by the numeral 14, the other end of the leaf 13 being pivotally connected to a shackle 16 depending from the side bar 11. The spring 14 is made up of the main leaf 13 and a plurality of supplemental leaves 17. The leaves 17 are each provided with a flat middle or supporting portion 18, the portions 18 of all of the leaves 17 being shaped so as to nest one into the other, the lowermost leaf having its supporting portions shaped to conform to the width of the top of the axle 10. Each leaf 17 is offset from both ends of the supporting portion as indicated at 19, and then extended forwardly and rearwardly so as to lie approximately parallel with the leaf 13, and with corresponding portions of the other leaves 17 thereby forming resilient portions. The resilient portions of the leaves 17 are of progressively increasing length from the lowermost to the uppermost, and the offset portions 19 are so shaped that the resilient portions of the several leaves are separated by substantial spaces. The free ends of the leaves 17 are maintained in spaced relation by means of spacing devices 20, each having a shoulder 21 engaging the free end of a leaf 17, and having a bearing portion 22 which contacts with the under surface of the leaf 17 immediately above.

Referring to Figure 2, the rear axle is indicated at 23 and the rear end of the bar 11 terminates just above the axle. Resting upon the axle 23 are leaves 13$^a$, and 17$^a$ just as described in connection with Figure 1. said leaves 17$^a$ being provided with the supporting portions 18$^a$ and the offset portions 19$^a$, the free ends of the leaves being separated by spacing devices 20$^a$. The forward end of the leaf 13$^a$ is connected with a shackle 24 attached to the side bar 11. The rear end of the leaf 13$^a$ is pivotally connected at 25 to a leaf spring 26, secured to the rear end of the side bar 11 and extending rearwardly therefrom. Co-operating with the leaf 26 are a series of leaves 27, each with a supporting portion 28 and an offset portion 29, the supporting portions nesting with each other and being secured to the side bar 11 by the same means which secures the leaf spring 26. The free ends of the leaves are maintained in spaced resilient relation by means of resilient spacing devices 30 similar to the devices 20 and 20$^a$.

In Figures 3, 4, 5 and 6 are illustrated modified forms of the resilient spacing devices. In Figure 3 such devices are in the form of a V shaped member 31 having shoulders 32 to contact with the adjoining faces of contiguous springs. In Figure 4 the spacing devices are in the form of helical springs 33, and in Figure 5 the spacing devices are in the form of curved ends 34 formed integral with the free ends of the springs. In Figure 6, the spacing devices are in the form of U-shaped bends 35, extensions 36 being provided, which are secured to the bodies of contiguous springs in suitable manner.

From what has been said it will be observed that by means of the supporting portions of the springs they are made to nest with each other in a manner to embrace the axles, the offset portions of the leaves serving to hold them against relative displacement. The leaves are so mounted that their free ends are spaced from each other, thereby greatly increasing their resilience and at the same time the reaction of the leaves one against the other is provided by the interposed spacing devices. Thus a maximum resiliency is obtained and friction on the leaves is practically avoided. At the same time provision is made for transmitting all of the stresses simultaneously to all of the leaves at the same time.

Having thus explained the nature of the invention and described an operative manner of constructing and using the same, although without attempting to set forth all of the forms in which it may be made, or all of the forms of its use, what is claimed is:—

1. A spring of the character described comprising a main leaf, a plurality of supplemental leaves, the latter being shaped to provide middle supporting portions and freely movable offset portions, the latter being parallel and relatively spaced with respect to each other, and spacing devices yieldably maintaining the extremities of the respective supplemental leaves in spaced relation with respect to an adjacent leaf.

2. A spring of the character described comprising a main leaf, a plurality of supplemental leaves, the latter being shaped to provide middle supporting portions contacting with each other in superposed relation, and also to form freely movable offset portions which are parallel and relatively spaced with relation to each other, and spacing devices yieldably maintaining the extremities of the respective supplemental leaves in spaced relation with respect to an adjacent leaf.

3. A spring of the character described comprising a main leaf, a plurality of supplemental leaves, the latter being shaped to provide middle supporting portions and freely movable offset portions, the latter being parallel and relatively spaced with respect to each other, spacing devices yieldably maintaining the extremities of the respective supplemental leaves in spaced relation with respect to an adjacent leaf, and means whereby said main leaf may be connected with the chassis of a vehicle.

4. A spring of the character described comprising a main leaf, a plurality of supplemental leaves, the latter being shaped to provide middle supporting portions, and freely movable offset portions which are parallel and relatively spaced with each other, said offset portions being of progressively increased length, and spacing devices engaging the extremities of the respective supplemental leaves and bearing against the end of the next adjacent longer leaf, whereby the supplemental leaves are yieldably maintained in spaced relation.

5. A spring of the character described comprising a main leaf, a plurality of supplemental leaves, the latter being shaped to provide middle supporting portions, and freely movable offset portions which are relatively spaced with respect to each other, and resilient spacing devices each having a shoulder engaging the free end of one leaf and having a bearing portion contacting with the contiguous surface of the next adjacent leaf.

6. A spring of the character described comprising a plurality of leaves having approximately parallel portions spaced apart at their ends, and contacting with each other at a location intermediate between the ends, and resilient spacing devices interposed in the respective spaced apart portions between each pair of contiguous leaves, each spacing device having offset portions bearing against the ends of said leaves.

In testimony whereof I have hereunto set my hand.

HARRY J. PARKER.